United States Patent
March Nomen et al.

(10) Patent No.: US 10,620,255 B2
(45) Date of Patent: Apr. 14, 2020

(54) EVALUATION METHOD AND SYSTEM FOR A LIGHTNING PROTECTION SYSTEM OF A WIND TURBINE COMPRISING A PLURALITY OF BLADES MADE OF CARBON FIBER REINFORCED PLASTIC OR POLYMER

(71) Applicant: GAMESA INNOVATION & TECHNOLOGY, S. L., Sarriguren (Navarra) (ES)

(72) Inventors: Victor March Nomen, Sarriguren (ES); David Romero Duran, Terrassa (ES); Ricard Horta Bernús, Terrassa (ES); Joan Montanyà Puig, Terrassa (ES)

(73) Assignee: SIEMENS GAMESA RENEWABLE ENERGY INNOVATION & TECHNOLOGY, S.L., Sarriguren (ES)

( * ) Notice: Subject to any disclaimer, the term of this patent is extended or adjusted under 35 U.S.C. 154(b) by 59 days.

(21) Appl. No.: 15/962,362

(22) Filed: Apr. 25, 2018

(65) Prior Publication Data

US 2018/0313884 A1    Nov. 1, 2018

(30) Foreign Application Priority Data

Apr. 28, 2017   (ES) .................................. 201700562

(51) Int. Cl.
*G01R 31/02*   (2006.01)
*F03D 80/30*   (2016.01)
(Continued)

(52) U.S. Cl.
CPC ........... *G01R 31/025* (2013.01); *F03D 17/00* (2016.05); *F03D 80/30* (2016.05); *G01J 5/0088* (2013.01);
(Continued)

(58) Field of Classification Search
CPC ....... G01R 31/025; Y02E 10/72; F03D 80/30; F03D 17/00; G01J 5/0088; G01J 5/10;
(Continued)

(56) References Cited

U.S. PATENT DOCUMENTS 9,835,141 B2 *  12/2017  Erichsen ................. F03D 80/30
2014/0341738 A1 * 11/2014  Bech ..................... F03D 1/0675
                                                              416/146 R

FOREIGN PATENT DOCUMENTS

ES   2 396 839 A1    2/2013
ES   2 594 452 A1   12/2016

OTHER PUBLICATIONS

Espacenet English abstract of EP 2458207 A2 which corresponds to ES 2 396 839 A1.
(Continued)

*Primary Examiner* — Melissa J Koval
*Assistant Examiner* — Trung Nguyen
(74) *Attorney, Agent, or Firm* — Ladas & Parry LLP

(57) ABSTRACT

Evaluation method and system for a lightning protection system of a wind turbine with blades, the lightning protection system including a down conductor connected to earth and to each blade by conductor plates embedded in the corresponding blade. The method is configured for determining the quality of the connections between the conductor plates and the blade thereof and includes injecting direct current between two conductor plates of one and the same blade, a flow of current being generated through the segment of the blade comprised between both conductor plates, measuring the voltage at measurement points of the segment, comparing the voltages to one another, and determining the quality of the connections between the conductor plates and the blade depending on the result of the comparison.

15 Claims, 3 Drawing Sheets

(51) Int. Cl.
   *G01J 5/10* (2006.01)
   *G01J 5/00* (2006.01)
   *F03D 17/00* (2016.01)
(52) U.S. Cl.
   CPC ............ *G01J 5/10* (2013.01); *F05B 2240/21* (2013.01); *F05B 2260/83* (2013.01); *F05B 2280/6003* (2013.01); *G01J 2005/0081* (2013.01); *Y02E 10/72* (2013.01)
(58) Field of Classification Search
   CPC .......... G01J 2005/0081; F05B 2240/21; F05B 2260/83; F05B 2280/6003
   USPC ....... 324/72, 72.5, 73.1, 633, 636, 600, 652, 324/675, 668, 682, 415–444, 500, 522, 324/713, 76.11, 76.77, 98
   See application file for complete search history.

(56) References Cited

OTHER PUBLICATIONS

Espacenet English abstract of EP 3106657 A1 which corresponds to ES 2 594 452 A1.

Romero, D., et al., "Investigation of potential distribution on a CFRP coupon under impulse current. Test results and FDTD simulation", 33$^{rd}$ International Conference on Lightning Protection, Sep. 25-30, 2016, 7 pages.

* cited by examiner

EVALUATION METHOD AND SYSTEM FOR A LIGHTNING PROTECTION SYSTEM OF A WIND TURBINE COMPRISING A PLURALITY OF BLADES MADE OF CARBON FIBER REINFORCED PLASTIC OR POLYMER

BACKGROUND OF THE INVENTION

Field of the Invention

The present invention relates to evaluation methods and systems for a lightning protection system of a wind turbine comprising a plurality of blades made of carbon fiber reinforced plastic or polymer, and more specifically to methods and systems for evaluating the quality of the connection between conductor plates to which a down conductor of the lightning protection system is connected and the corresponding blade.

Related Art

Current wind turbines can be considered elevated structures where, furthermore, a large portion of its structure is moving. In addition to this, it must be taken into account that wind turbines are often located at sites where they are very exposed to lightning impacts. Since they are elevated structures (modern wind turbines can even exceed 200 m), they can present a high number of upward lightning (turbine to cloud) initiated by the structure itself. This type of lightning is usually characterized by the presence of a direct component, and it usually causes the most damage due to its high energy.

The large dimensions of current wind turbines have caused manufacturers to resort to using carbon fiber reinforced plastic or polymer (CFRP) as a material in manufacturing blades. Given that CFRP is electrically conductive, this must be taken into account when developing the lightning protection system (LPS) of the wind turbine connected to the blade itself. The article entitled "*Investigation of potential distribution on a CFRP coupon under impulse current. Test results and FDTD simulation*", by D. Romero et al., International Conference on Lightning Protection, 25-30 Sep. 2016, shows analytical results obtained in relation to the distribution of potential in materials of this type in response to current impulses with different rise times (considerations arising when a lightning impacts on the blade). To conduct testing, current impulses are injected into a segment of the blade and in said segment the potential between different points of said segment is measured.

Lightning protection systems normally comprise a down conductor connected to earth and to each blade by means of conductor plates, as disclosed in patent documents ES2396839A1 and ES2594452A1, belonging to the same applicant. Each conductor plate is embedded in its corresponding blade and normally extends along the entire width of the blade. A plurality of conductor plates are arranged in one and the same blade, being longitudinally distributed in said blade P. In order for the lightning protection system to work correctly, correct connection between the conductor plates and the blade must be assured, since some of the lightning discharge current passes through the blade in the earthing thereof, as it is connected with the down conductor of the lightning protection system.

BRIEF SUMMARY OF THE INVENTION

The object of the invention is to provide an evaluation method and system for a lightning protection system of a wind turbine comprising a plurality of blades made of carbon fiber reinforced plastic or polymer, as defined in the claims.

A first aspect of the invention relates to an evaluation method for a lightning protection system of a wind turbine comprising a plurality of blades made of carbon fiber reinforced plastic or polymer. The lightning protection system comprises a down conductor connected to earth and to each blade by means of a plurality of conductor plates that are embedded in the corresponding blade, that are longitudinally distributed in said blade, each conductor plate extending along the entire width of said blade. The evaluation method is configured for determining the quality of the connections between the conductor plates and the corresponding blade.

The method comprises the following successive steps:
injecting direct current between two conductor plates of one and the same blade, a flow of current being generated through the segment of the blade comprised between both conductor plates,
measuring the voltage with respect to a certain common reference point at a plurality of surface measurement points of said segment of the blade and distributed in a substantially linear manner along the width of said blade,
comparing the measured voltages to one another, and
determining the quality of the connections between said conductor plates and said blade depending on the result of said comparison, better quality being determined the closer the measured values are to one another.

It has been found that the better a connection is, the more uniform current distribution will be, particularly taking the width of the blade as a reference. Therefore, by comparing the different voltage measurements at surface measurement points of the blade, the quality of the connections between the conductor plates and the corresponding blade can be determined. The more equal the compared measured voltages are, the more uniform current distribution is, given that it will be similar at all measurement points. However, if substantially different voltage values are detected at two measurement points, this denotes that the current through the blade at said measurement points, between the two connections, is also substantially different and that the current distribution along the blade is therefore not homogenous, it being determined that the quality of the connections (or of at least one of them) is not suitable.

The state of the connections between the blade and the corresponding conductor plates can thus be validated with the proposed evaluation method in a rather non-invasive and easy-to-implement manner using common equipment in industrial production environments. Furthermore, the time required for performing the check is relatively short, which does not complicate the introduction thereof in the wind turbine blade production process, for example.

A second aspect of the invention relates to an evaluation system of a lightning protection system of a wind turbine comprising a plurality of blades made of carbon fiber reinforced plastic or polymer. The lightning protection system comprises a down conductor connected to earth and to each blade by means of a plurality of conductor plates that are embedded in the carbon fiber laminates of the corresponding blade, longitudinally distributed in said blade, each conductor plate extending along the entire width of said blade. The evaluation system is configured for determining the quality of the connections between the conductor plates and the corresponding blade.

The evaluation system comprises an injection device configured for injecting direct current into a blade, between two conductor plates of said blade, through one of said conductor plates, a measuring device configured for measuring the voltage with respect to a certain common reference point at a plurality of surface measurement points of said blade between both conductor plates, said measurement points being distributed such that they are substantially aligned along the width of the blade, and a control device communicated with the measuring device for receiving said voltage measurements and configured for comparing said measurements to one another and for determining the quality of the connection between said conductor plates and said blade depending on the result of said comparison, better quality being determined the closer the measured values are to one another. The advantages discussed for the evaluation method of the first aspect of the invention are obtained with the evaluation system.

These and other advantages and features of the invention will become evident in view of the drawings and the detailed description of the invention.

DETAILED DESCRIPTION OF THE INVENTION

Figure 1:
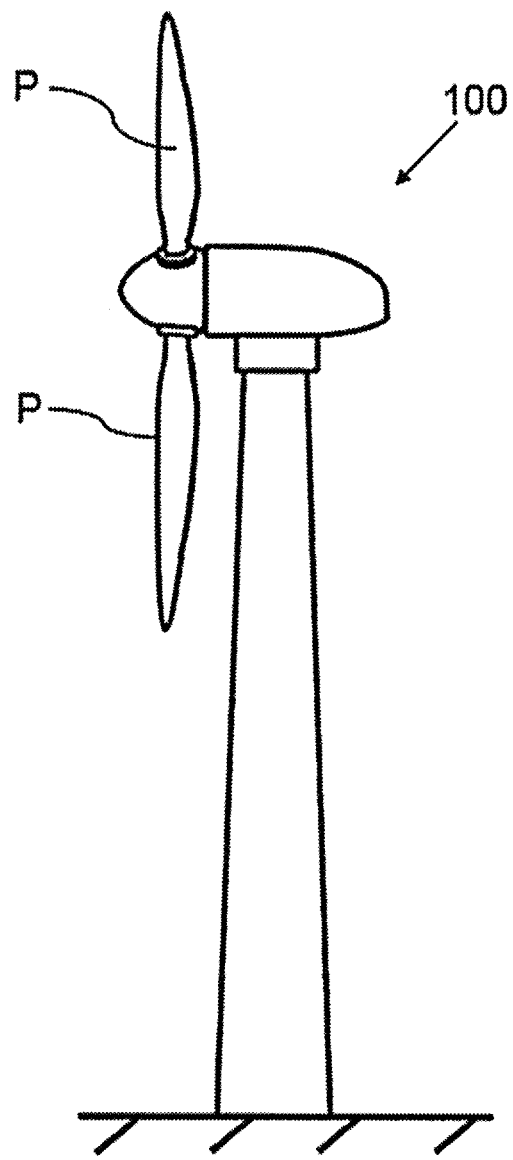
FIG. 1 shows a wind turbine without a lightning protection system.
Figure 2:
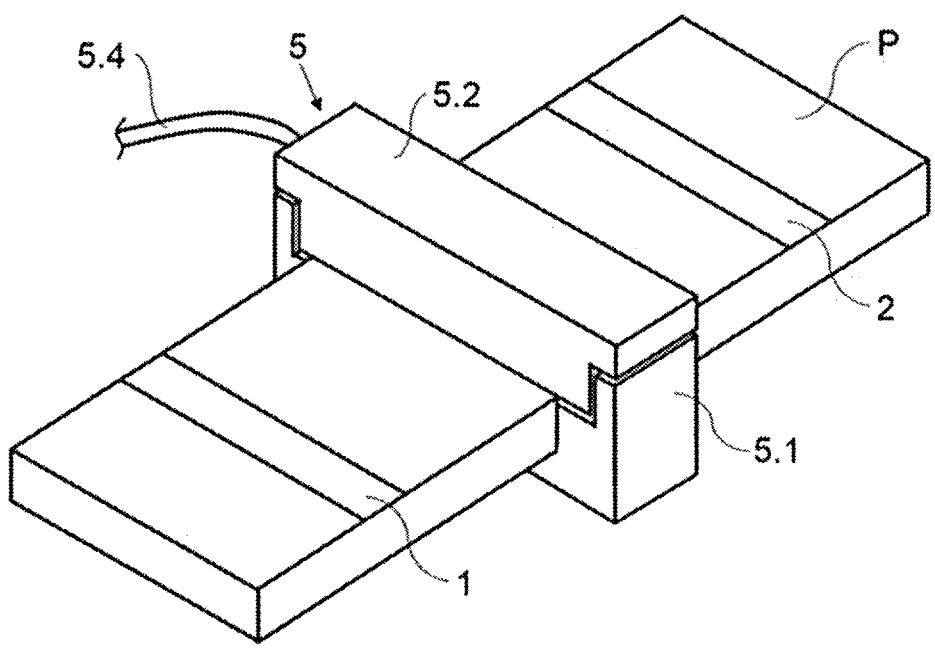
FIG. 2 is a partial perspective view of a blade of a wind turbine, with a measuring device of one embodiment of the evaluation system of the invention.
Figure 3A:
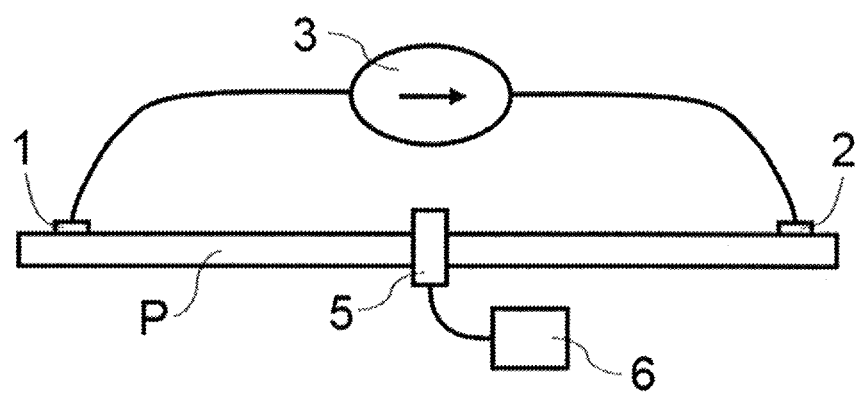
FIGS. 3a and 3b schematically depict an equivalent electrical circuit of one embodiment of the evaluation system of the invention.
Figure 3B:
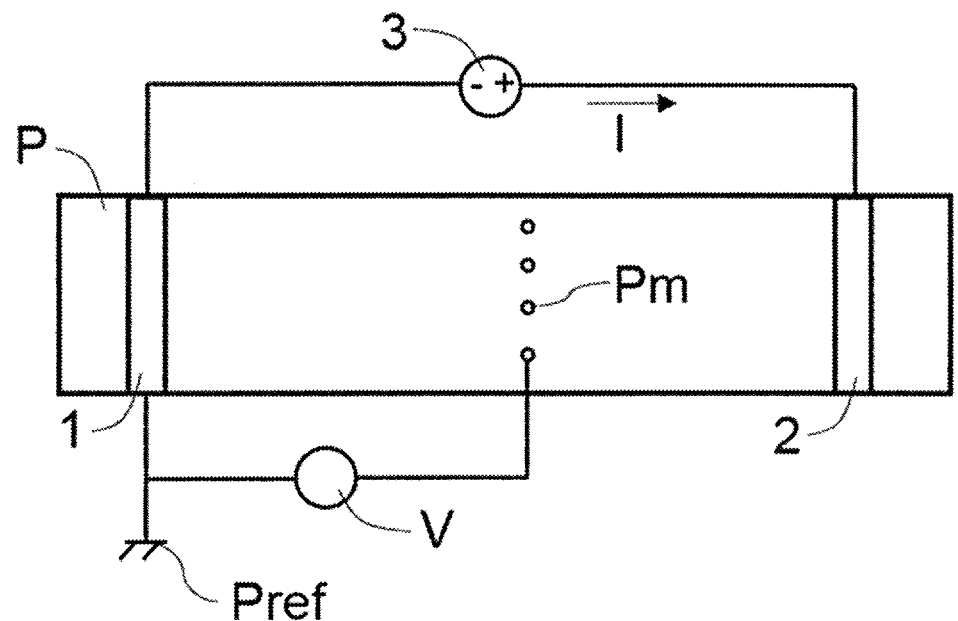
Figure 4:
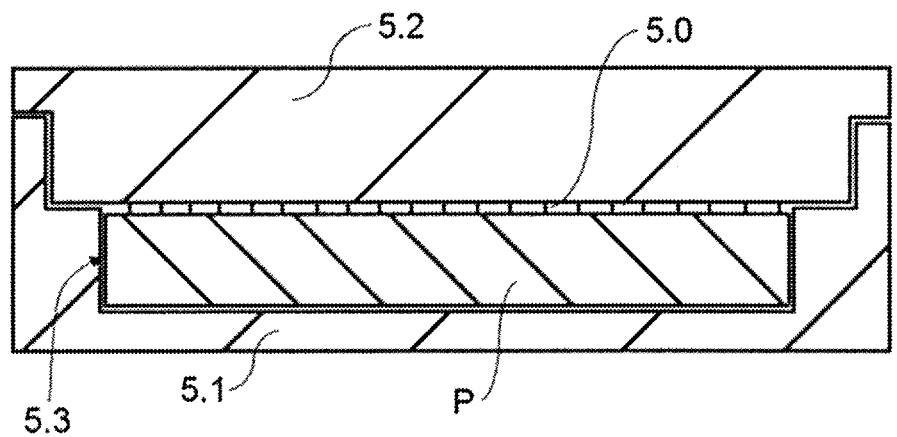
FIG. 4 shows the measuring device of FIG. 2 and a section view of a blade associated with said measuring device.

A first aspect relates to an evaluation method for a lightning protection system of a wind turbine 100 comprising a plurality of blades P made of carbon fiber reinforced plastic or polymer (CFRP). The lightning protection system comprises a down conductor, not depicted in the drawings, which is connected to earth and to each blade P by means of a plurality of conductor plates 1 and 2. The conductor plates 1 and 2 are embedded in the carbon fiber laminates of the corresponding blade P, longitudinally distributed in said blade P, each conductor plate extending along the entire width of said blade P. The evaluation method is configured for determining the quality of the connections between the conductor plates 1 and 2 and the corresponding blade P, such that correct operation of the lightning protection system can be assured.

The method comprises the following successive steps:
injecting direct current between two conductor plates 1 and 2 of one and the same blade P, a flow of current being generated through the segment of the blade P comprised between both conductor plates 1 and 2,
measuring the voltage V with respect to a certain common reference point Pref at a plurality of surface measurement points Pm of said segment of the blade P and distributed in a substantially linear manner along the width of said blade P,
comparing the measured voltages V to one another, and determining the quality of the connections between said conductor plates 1 and 2 and said blade P depending on the result of said comparison, better quality being determined the closer the measured values are to one another.

The determined quality can depend on the criteria required in each case, such that there can be previously established, depending on said criteria, the maximum allowable difference between the measured voltages V, to enable determining that the quality of the connections 1 and 2 is good or suitable, and the difference beyond which the quality of said connections 1 and 2 is determined to be not suitable or allowable, since the more uniform the voltages are, the more homogenous the electric current I will be along the length of said blade P, and therefore the better the connections will be. The difference can be established, for example, between the minimum voltage V between measurements and the maximum voltage V between measurements (between different measurement points). The dispersion of the measured voltage V values is preferably equal to or less than 10% to indicate that the quality of the connections is suitable.

Each of the voltage V measurements is taken by contact of a sensor 5.0 with respect to the corresponding measurement point Pm of the blade P, said sensor 5.0 comprising a metal measuring tip the end of which contacts with the corresponding measurement point Pm, the contact of said sensors 5.0 with the blade P being caused to take said measurements. To perform the mentioned steps of the evaluation method, in a preparation step prior to injecting direct current I the segment of the blade P between the two conductor plates 1 and 2 and the sensors 5.0 are arranged with respect to one another such that they are facing one another, and the sensors 5.0 move towards the blade P in that situation to cause contact with the blade P and to adjust the contact force as needed.

The sensors 5.0 are comprised in a measuring device 5 which preferably comprises a first element 5.1 and a second element 5.2 between which the segment of the blade P comprising the measurement points Pm is arranged. The sensors 5.0 are arranged in one of said elements 5.1 and 5.2, facing the other element, and therefore facing said segment of the blade P when said segment is arranged between both elements 5.1 and 5.2. More details about said measuring device 5 will be provided below when discussing the evaluation system of the invention, but said measuring device 5 could be applied in the evaluation method.

Furthermore, to assure correct voltage V measurements, during said measurements, and preferably during the entire interval for injecting direct current I, the sensors 5.0 remain stationary. To that end, and in the case of a measuring device 5 like the one discussed in the preceding paragraph being used, element 5.1 not comprising the sensors 5.0 is coupled to the blade P, and element 5.2 comprising the sensors 5.0 is fixed to the element 5.1 in a given position (once the required contact force has been adjusted).

Voltage V measurements are taken with a substantially constant magnitude of the injected direct current I, said magnitude further being comprised between a given upper limit and a given lower limit. The upper limit prevents excessive heating of the corresponding segment of the blade P in order to prevent damaging said blade P, and the lower limit seeks to assure voltage V measurements, since excessively small values of the magnitude of the direct current I can distort said voltage V measurements, such that the larger the section of the blade P (particularly the section of the part of the blade P manufactured with CFRP) is, the larger this minimum current must be to assure said measurement quality. The upper current injection limit is established depending on the geometry of the carbon laminate used in manufacturing the blade P, since excess current would excessively heat the material, being able to cause damage, and the section of the conductor (carbon laminate) defines the maximum current to be injected. For a given example, the lower and upper limits could be about 2 A and 5 A.

In some embodiments of the method, in addition to voltage V measurements, the temperature is also measured during the injection of direct current I at measurement points or areas of the blade P distributed in a substantially linear manner along the width of said blade P. Said temperature measurements are compared to one another, and the quality of the connections 1 and 2 is determined depending on the result of said comparisons, as occurs with the voltages V. The temperature at a measurement point is also a reflection of the direct current I flowing through said measurement point, such that the more homogenous the temperature measurements are, the better the connections 1 and 2 will be. However, if different temperatures are measured at different measurement points, this is a reflection of a non-homogenous distribution, it being determined that the quality of the connections between the conductor plates 1 and 2 and the blade P is not good in that case (or the quality is worse the greater the difference in temperatures). The criterion for determining whether or not quality is suitable can be the same one used for the case of voltages. The measurement points or areas the temperature of which is measured do not have to coincide with the measurement points Pm the voltage of which is measured, and they are preferably areas close to the conductor plate 2 where current is injected into the blade P. By measuring the temperature in an area close to one of the conductor plates 1 and 2, thermal dynamics can be seen more clearly and in less time, and therefore the test can be shorter in duration, favoring its use and reducing the risks of subjecting the material to excessive thermal fatigue.

In these embodiments, the quality determined from the temperature measurements is further compared with the quality determined from the measured voltages V, and said determination is validated if the quality that is determined is close or equal in both cases. Therefore, the previously determined quality is furthermore ascertained by means of temperature measurements.

The method is preferably applied between each two conductor plates 1 and 2 of each blade P, the quality of the connections of said blade P between all the conductor plates 1 and 2 and said blade P thereby being evaluated.

Furthermore, the method is preferably implemented during the method of manufacturing a blade P, before installing the blade P in a corresponding wind turbine 100.

A second aspect of the invention relates to an evaluation system of a lightning protection system of a wind turbine 100 such as the one shown by way of example in FIG. 1, the wind turbine 100 comprising a plurality of blades P made of carbon fiber reinforced plastic or polymer (CFRP). The lightning protection system comprises a down conductor, not depicted in the drawings, which is connected to earth and to each blade P by means of a plurality of conductor plates 1 and 2. The conductor plates 1 and 2 are embedded in the carbon fiber laminates of the corresponding blade P, longitudinally distributed in said blade P, each conductor plate extending the entire width of said blade P. The evaluation system is configured for determining the quality of the connections between the conductor plates 1 and 2 and the corresponding blade P, such that correct operation of the lightning protection system can be assured.

The evaluation system is suitable for supporting an evaluation method such as the method of the first aspect of the invention, and can thereby be configured to suit the configuration and/or embodiment of the evaluation method it must support. Likewise, the features and advantages discussed for the evaluation method are therefore also valid for the evaluation system, even if they are not repeated.

The evaluation system comprises an injection device 3 configured for injecting direct current I into a blade P, between two conductor plates 1 and 2 of said blade P, through one of said conductor plates 1 and 2, and a measuring device 5 configured for measuring the voltage V with respect to a certain common reference point Pref at a plurality of surface measurement points Pm of said blade P between both conductor plates 1 and 2 by contact, said measurement points Pm being distributed such that they are substantially aligned along the width of the blade P. The reference point Pref can be, for example, the frame of the measuring device 5 itself (which is preferably connected to earth) or a point of the blade P itself. A measurement point Pm of the blade P corresponds with the point of the blade P with which a sensor 5.0 of the measuring device 5 contacts. The sensor 5.0 of the measuring device 5 preferably comprises a metal tip the end of which contacts with the point of the blade P, measurement point Pm, the voltage V of which is to be measured. The measuring device 5 comprises as many sensors 5.0 as there are voltage V measurements to be obtained, and the distance between two contiguous sensors 5.0 will depend on pre-established requirements.

The evaluation system further comprises a control device 6 communicated with the measuring device 5 for receiving said voltage V measurements. Communication is preferably performed by means of a corresponding wiring 5.4, but it could alternatively be performed in a wireless manner. The control device 6 is configured for comparing said measurements to one another and for determining the quality of the connection between said conductor plates 1 and 2 and said blade P depending on the result of said comparison, better quality being determined the closer the measured values are to one another. The control device 6 comprises a microprocessor, a controller, an FPGA or any other type of device capable of processing data and making calculations, for being able to carry out the aforementioned operations (at least the comparison of the measurements and the determination of the quality based on the comparison). The explanation provided above in relation to determination of the quality for the evaluation method of the invention is likewise valid for the evaluation system.

In the preferred embodiment, the measuring device 5 comprises a first element 5.1 and a second element 5.2 which are attached to one another, between which there is defined a gap 5.3 for receiving the blade P, the voltage V thereby being measured at measurement points of the area of the blade P which is arranged in said gap 5.3. The elements 5.1 and 5.2 thus comprise two facing surfaces, each element 5.1 and 5.2 comprising one surface, between which the blade P is arranged when said blade is housed in the gap 5.3, the sensors 5.0 being arranged on one of said surfaces for contacting with the blade P when said blade P is in said gap 5.3. Said facing surfaces thereby cover the width of the blade P.

The first element 5.1 and the second element 5.2 are attached to one another with freedom of movement in the sense of the facing surfaces moving closer to or away from one another. This movement allows adjusting the contact force between the measuring tips of the sensors 5.0 and the measurement points of the blade P, the voltage V measurements therefore being able to be obtained from the desired contact between the sensors 5.0 and the measurement points.

In the evaluation method of the first aspect of the invention, in the case of using a measuring device 5 of this type contact of the sensors 5.0 with the blade P, and with the required contact force, is caused by means of the relative movement of the second element 5.2 with respect to the first element 5.1.

In the preferred embodiment of the evaluation system, the first element 5.1 is suitable and configured for being coupled to the blade P by means of a closure system not depicted in the drawings assuring a suitable pressure of the first element 5.1 on the blade P. The closure system can also act on the second element 5.2 to assure suitable pressure. The second element 5.2 moves with respect to the first element 5.1 to adjust the contact force, the sensors 5.0 being arranged in said second element 5.2 such that the corresponding measuring tips project from the surface of said second element 5.2 facing the first element 5.1, towards said first element 5.1. The coupling capacity of the first element 5.1 allows keeping the measuring device 5 stationary while taking voltage measurements at the measurement points of the blade P, correct measurements thereby being assured.

The injection device 3 is suitable and configured for the magnitude of the direct current I being injected to be comprised in a range preferably bound between an upper limit, to prevent excessive heating of part of the blade P through which said direct current I flows, with the risk of damaging it, and a lower limit, to assure correct voltage V measurements (excessively low direct current I values can distort voltage measurements). The explanation relating to these limits provided for the first aspect of the invention is likewise valid for this case.

In some embodiments, the evaluation system comprises a thermographic camera suitable for measuring the temperature at measurement points or areas of the blade P distributed in a substantially linear manner along the width of said blade P, between the two conductor plates 1, 2, the control device 6 being suitable for receiving said measurements and configured for comparing them and for determining the quality of the connections 1 and 2 depending on the result of said comparisons, better quality being determined the closer the measured values are to one another. In these embodiments, the control device 6 is further configured for comparing the quality determined from the temperature measurements with the quality determined from the measured voltages, and for validating said determination if the quality that is determined is close or equal. Therefore, the previously determined quality is furthermore ascertained by means of temperature measurements. The measurement points or areas the temperature of which is measured do not have to coincide with the measurement points Pm the voltage of which is measured, and they are preferably areas close to the conductor plate 2 where current is injected into the blade P. By measuring the temperature in an area close to one of the conductor plates 1 and 2, thermal dynamics can be seen more clearly and in less time, and therefore the test can be shorter in duration, favoring its use and reducing the risks of subjecting the material to excessive thermal fatigue.

The thermographic camera can be comprised in the measuring device 5, or it can be a device that is independent of said measuring device 5 and is communicated with the control device 6.

The invention claimed is:

1. An evaluation method for a lightning protection system of a wind turbine comprising a plurality of blades made of carbon fiber reinforced plastic or polymer, the lightning protection system comprising a down conductor connected to earth and to each of the plurality of blades by a plurality of conductor plates that are embedded in a corresponding blade of the plurality of blades, that are longitudinally distributed in said corresponding blade, each of the plurality of conductor plates extending along an entire width of said corresponding blade, wherein the evaluation method is configured for determining a quality of connections between the plurality of conductor plates and the corresponding blade and comprises the following successive steps:

injecting direct current between two conductor plates of the plurality of conductor plates that are embedded in the corresponding blade by generating a flow of current through a segment of the corresponding blade comprised between the two conductor plates, measuring a voltage with respect to a certain common reference point at a plurality of surface measurement points of said segment of the corresponding blade and distributed in a substantially linear manner along the width of said corresponding blade, comparing measured voltages measured in said step of measuring the voltage to one another, and determining the quality of the connections between said two conductor plates and said corresponding blade depending on a result of said comparison, better quality being determined the closer measured values are to one another.

2. The evaluation method according to claim 1, wherein each of the measured voltages measured in the step of measuring the voltage is taken by contact of at least one sensor with respect to a corresponding measurement point of the corresponding blade, the at least one sensor comprising a metal measuring tip, an end of which contacts with the corresponding measurement point, the contact of said at least one sensor with the corresponding blade being caused to measure the voltages.

3. The evaluation method according to claim 2, comprising a preparation step prior to the step of injecting direct current, wherein the segment of the corresponding blade between the two conductor plates and the at least one sensor are arranged with respect to one another such that the segment of the corresponding blade and the at least one sensor are facing one another, and the at least one sensor is configured to move towards the corresponding blade in that situation to cause contact with the corresponding blade and to adjust a contact force between said at least one sensor and said corresponding blade.

4. The evaluation method according to claim 3, wherein the at least one sensor remains stationary during the step of measuring the voltage.

5. The evaluation method according to claim 1, comprising determining whether the quality of the connections is suitable when maximum dispersion between the measured voltages is equal to or less than 10%.

6. The evaluation method according to claim 1, wherein during the step of measuring the voltage, the direct current injected in the step of injecting direct current comprises a substantially constant magnitude and is comprised between an upper limit and a lower limit which are determined depending on a geometry of a carbon laminate used to manufacture the corresponding blade.

7. The evaluation method according to claim 1, wherein during the step of injecting direct current, a temperature is further measured at measurement points or areas of the corresponding blade distributed in a substantially linear manner along the width of said corresponding blade, between the two conductor plates, temperatures measured are compared to one another, the quality of the connections between the two conductor plates and said corresponding blade is determined depending on a result of said comparisons, better quality being determined the closer the measured values are to one another, a quality determined from the temperature measured is compared with the quality determined from the measured voltages, and said determination is validated if the quality determined from the temperature measured is close or equal to the quality determined from the measured voltages.

8. The evaluation method according to claim 1, wherein the method is implemented while the corresponding blade is being manufactured, before installing the corresponding blade in a corresponding wind turbine.

9. An evaluation system of a lightning protection system of a wind turbine comprising a plurality of blades made of carbon fiber reinforced plastic or polymer, the lightning protection system comprising a down conductor connected to earth and to each of the plurality of blades by a plurality of conductor plates that are embedded in the carbon fiber laminates of a corresponding blade of the plurality of blades, that are longitudinally distributed in said corresponding blade, each of the plurality of conductor plates extending along an entire width of said corresponding blade, and the evaluation system being configured for determining a quality of connections between the plurality of conductor plates and the corresponding blade, wherein the evaluation system comprises:
   an injection device configured for injecting direct current between two conductor plates of the plurality of conductor plates that are embedded in the corresponding blade by generating a flow of current through a segment of the corresponding blade comprised between the two conductor plates,
   a measuring device configured for measuring a voltage with respect to a certain common reference point at a plurality of surface measurement points of said segment of the corresponding blade and distributed in a substantially linear manner along the width of the corresponding blade, and
   a control device communicated with the measuring device for receiving said voltage measured by the measuring device and configured for comparing said the voltage measured by the measuring device to one another and for determining the quality of the connection between said two conductor plates and said corresponding blade depending on a result of said comparison, better quality being determined the closer measured values are to one another.

10. The evaluation system according to claim 9, wherein the measuring device comprises at least one sensor with respect to a corresponding measurement point of the corresponding blade, the at least one sensor comprising a metal measuring tip, an end of which contacts with the corresponding measurement point, the contact of said at least one sensor with the corresponding blade being caused to measure the voltages.

11. The evaluation system according to claim 10, wherein the measuring device comprises a first element and a second element which are attached to one another, between which there is defined a gap for receiving the corresponding blade, the measuring device being suitable for measuring the voltage at the plurality of surface measurement points of an area of the corresponding blade which is arranged in said gap.

12. The evaluation system according to claim 11, wherein the first and second elements of the measuring device comprise two facing surfaces, each of the first and second elements comprising one of the two facing surfaces, between which the corresponding blade is arranged when said corresponding blade is housed in the gap, the at least one sensor being arranged on one of said surfaces for contacting with the corresponding blade when said blade is in said gap.

13. The evaluation system according to claim 12, wherein the first element and the second element of the measuring device are attached to one another with relative freedom of movement in the sense of the respective facing surfaces moving closer to or away from one another, to be able to adjust a contact force between the at least one sensor and the corresponding blade.

14. The evaluation system according to claim 13, wherein the first element of the measuring device is suitable and configured for being coupled to the corresponding blade, when said corresponding blade goes through the gap defined between the first and second elements of said measuring device, the second element being suitable and configured for moving with respect to the first element to adjust the contact force, and the at least one sensor being arranged in said second element such that corresponding measuring tips project from the surface of said second element facing the first element, towards said first element.

15. The evaluation system according to claim 9, comprising a thermographic camera suitable for measuring a temperature at measurement points of the corresponding blade distributed in a substantially linear manner along the width of said corresponding blade between the two conductor plates, the control device being suitable for receiving said temperature measured and configured for comparing said temperature measured to one another, for determining the quality of the connections between said conductor plates and the corresponding blade depending on a result of said comparisons, better quality being determined the closer measured values are to one another, for comparing the quality determined from the temperature measurements with the quality determined from the measured voltages, and for validating said determination if the quality determined from the temperature measured is close or equal to the quality determined from the measured voltages.

* * * * *